United States Patent [19]
Li et al.

[11] Patent Number: 6,159,553
[45] Date of Patent: Dec. 12, 2000

[54] THERMAL BARRIER COATING FOR SILICON NITRIDE

[75] Inventors: Chien-Wei Li, Livingston, N.J.; Thomas Edward Strangman, Phoenix, Ariz.

[73] Assignee: The United States of America as represented by the Secretary of the Air Force, Washington, D.C.

[21] Appl. No.: 09/208,109

[22] Filed: Nov. 27, 1998

[51] Int. Cl.[7] .................... B05D 3/02; C23C 4/10
[52] U.S. Cl. ................ 427/452; 427/454; 427/376.2; 427/397.7
[58] Field of Search .................. 427/397.7, 454, 427/452, 376.2; 501/97.1; 432/13

[56] References Cited

U.S. PATENT DOCUMENTS 4,882,109 11/1989 Matsui et al. ................. 427/454
5,869,146 2/1999 McCluskey et al. ............ 427/452

FOREIGN PATENT DOCUMENTS 2-192471 7/1990 Japan .
4-026552 1/1992 Japan .
8-277179 10/1996 Japan .

*Primary Examiner*—Katherine A. Bareford
*Attorney, Agent, or Firm*—Thomas C. Stover

[57] ABSTRACT

A coating of whisker shaped beta silicon nitride grains are formed upon a silicon nitride substrate by sintering over a period of several hours, and the resulting product has a porous reaction bond coating strongly adhered to the silicon nitride substrate.

8 Claims, No Drawings

THERMAL BARRIER COATING FOR SILICON NITRIDE

STATEMENT OF GOVERNMENT INTEREST

The invention described herein may be manufactured and used by or for the Government for governmental purposes without the payment of any royalty thereon.

BACKGROUND OF THE INVENTION

The present invention relates to thermal barrier coating methods.

Aircraft turbine engine components such as superalloy turbine vanes and blades can be protected against extremely high temperatures produced in aircraft turbine combustion chambers. Thermal barriers of protective nonoxide ceramic coatings are often applied to the metallic turbine engine components. Such thermal barriers may comprise refractory ceramic materials of silicon carbide and silicon nitride which can have high fracture strength in high temperature environments, have good thermal shock resistance, and can be fabricated into required shapes and sizes. See for example the following U.S. Pat. No. 5,626,923 to Fitzgibbons et al.; U.S. Pat. No. 5,639,531 to Chen et al.; U.S. Pat. No. 4,553,455 to Craig et al.; U.S. Pat. No. 4,405,660 to Ulion et al. and U.S. Pat. No. 5,514,482 to Strangrnan, all incorporated by reference herein.

SUMMARY OF THE INVENTION

In accordance with the invention, a protective thermal barrier coating is produced which can result in substantial weight reduction of the aforesaid structural components and cooling flow rates for turbine engines. It is desired to form a strong, porous, reaction-bond protective coating consisting mainly of whisker-shaped beta silicon nitride grains on a silicon nitride based protective ceramic substrate, such protective coating functioning as a thermal barrier, or as an interlayer for a subsequent additional thermal barrier plasma spray coating. The bonding between the protective coating and the silicon nitride ceramic substrate is strong, and the resulting porous and whisker-like microstructure coating helps reduce the heat conduction rate, and improves the adherence of the additional optional plasma spray coating, which can be subsequently applied over the reaction-bond protective coating.

DETAILED DESCRIPTION OF A PREFERRED EMBODIMENT OF THE INVENTION

In accordance with one example of the invention, an aqueous powder slurry was provided having a powder containing about 80 wt % silicon nitride, about 10 wt % boron nitride, and the balance of sintering aids of oxides of lanthium, yttrium and stronthium oxides, was sprayed on a green silicon nitride substrate having the composition of about 91.4 wt % silicon nitride, 5.1 wt % lanthanum oxide, 1.7 wt % yttrium oxide, 1.2 wt % stronthium oxide and 0.6 wt % SiC. The resulting product was dried and sintered in a graphite furnace at 1800 degrees centigrade for two hours, then at 1950 degrees centigrade for three hours, and thereafter at 2000 degrees centigrade for two hours. The resulting product had the desired porous reaction-bond coating consisting mainly of beta silicon nitride whiskers strongly adhered to the densified substrate. An additional plasma-sprayed layer was applied comprising zirconium oxide, tantalum oxide and mullite, which is a Mineral comprising a silicate of aluminum, used as a refractory material. More specifically, the as-fired surface of a silicon nitride sintered plate of greater than 99.5% density and consisting of 5.4 wt % $La_2O_3$, 1.7% $Y_2O_3$, 1.2% SrO, 0.6% SiC, and 81.4% $Si_3N_4$ was coated with a slurry containing 40% water, and 60% powders having the composition of 5.74% $La_2O_3$, 1.92% $Y_2O_3$, 1.35% SrO added as $SrCO_3$, 0.54% SiC, 80.46% $Si_3N_4$, and 10% BN. The as-coated part was sintered at the aforesaid elevated temperatures, and a dense and strong silicon nitride coating of about one mm thick formed on the substrate after sintering. Alternatively, the above mentioned slurry composition was applied upon a green silicon nitride of the same composition using a spray gun, and equally high quality coating was obtained after sintering.

In accordance with another example, wherein the boron nitride can be eliminated, a strong silicon nitride coating of 60–95% dense on a greater than 99% dense silicon nitride substrate was developed. The preparation steps consist of preparing the aqueous slurry using a typical cerarmic processing technique such as ball milling, applying the coating to the substrate using a paint brush or spray gun and sintering the coated part at the aforesaid elevated temperatures. The coating may be applied on a green or densified silicon nitride substrate. The aqueous slurry contains 55–75 percent silicon nitride, and sintering aid powders which are preferably substantially similar to those used in fabricating the substrate SiN. The use of BN powder to control the coating shrinkage factor is optional. The as-coated parts are typically sintered at temperatures higher than 1800 degrees C to consolidate the coating and enhance the bond strength of the coating. If the substrate material is green, the coating can be co-sintered with the substrate without cracking.

The weight percentages in the first example may be varied so that the powder contains 70–90% of silicon nitride and 1–20% of boron nitride. The sintering aid powders can be varied so long as an oxide thereof has at least one element selected from the group consisting of group 3b or 2a of the periodic table, namely Sc, Y, La, Mg, Ca, Sr, and Ba.

Thus, a strong, porous ceramic layer consisting mainly of whisker-shaped beta silicon nitride is reaction-bond coated on a silicon nitride based ceramic substrate using a slurry coating and sintering process. The reaction-bond coating may serve as a thermal barrier, or as an interlayer between the substrate and a subsequently applied plasma sprayed layer which could include zirconia oxide, tantalum oxide, and mullite.

As variants of the foregoing will be apparent to the skilled worker in the art, the scope of the invention is to be limited solely by the terms of the following claims and art recognized equivalents thereof.

What is claimed is:

1. Method of producing a thermal barrier coating for a component subject to thermal stress comprising the steps of:
   (a) providing a silicon nitride substrate;
   (b) applying a composition, said composition including a powder containing silicon nitride, boron nitride and sintering aids, upon said silicon nitride substrate, said powder containing about 70–90 weight percent silicon nitride, about 1–20 weight percent boron nitride, and a balance of sintering aids of oxides of at least one element selected from the group consisting of Sc, Y, La, Mg, Ca, Sr, and Ba; and
   (c) drying and sintering the composition produced in accordance with step (b) at temperatures and times sufficient to produce said thermal barrier coating having whisker-shaped beta silicon nitride grains therein.

2. The method of claim 1 wherein step (c) includes sintering at 1800 degrees centigrade for a period of two hours, thereafter sintering at 1950 degrees centigrade for a period of three hours and thereafter sintering at 2000 degrees centigrade for two hours.

3. The method of claim 2 further including applying an additional plasma sprayed layer of refractory material over the coating produced in accordance with step (c), said refractory material selected from the group consisting of zirconium oxide, tantalum oxide and mullite.

4. The method of claim 1 further including applying an additional plasma sprayed layer of refractory material over the coating produced in accordance with step (c) said refractory material selected from the group consisting of zirconium oxide, tantalum oxide and mullite.

5. Method of producing a thermal barrier coating for a component subject to thermal stress comprising the steps of:

(a) providing a silicon nitride substrate;

(b) applying a composition, said composition being an aqueous slurry and including silicon nitride and sintering aids, upon said silicon nitride substrate, said composition containing 55–74 weight percent silicon nitride, and a balance of sintering aids of oxides of at least one element selected from the group consisting of Sc, Y, La, Mg, Ca, Sr, and Ba; and (c) drying and sintering the composition produced in accordance with step (b) at temperatures and times sufficient to produce said thermal barrier coating having whisker-shaped beta silicon nitride grains therein.

6. The method of claim 5 wherein step (c) includes sintering at 1800 degrees centigrade for a period of two hours, thereafter sintering at 1950 degrees centigrade for a period of three hours and thereafter sintering at 2000 degrees centigrade for two hours.

7. The method of claim 6 further including applying an additional plasma sprayed layer of refractory material over the coating produced in accordance with step (c), said refractory material selected from the group consisting of zirconium oxide, tantalum oxide and mullite.

8. The method of claim 5 further including applying an additional plasma sprayed layer of refractory material over the coating produced in accordance with step (c), said refractory material selected from the group consisting of zirconium oxide, tantalum oxide and mullite.

* * * * *